US010260291B2

(12) United States Patent
Hirvela et al.

(10) Patent No.: US 10,260,291 B2
(45) Date of Patent: Apr. 16, 2019

(54) PORTABLE DRILL PIPE HARD BANDING MACHINE

(71) Applicant: Broco, Inc., Ontario, CA (US)

(72) Inventors: George Ray Hirvela, Riverside, CA (US); Johnson Mac, Riverside, CA (US)

(73) Assignee: Broco, Inc., Ontario, CA (US)

( * ) Notice: Subject to any disclaimer, the term of this patent is extended or adjusted under 35 U.S.C. 154(b) by 105 days.

(21) Appl. No.: 15/499,766

(22) Filed: Apr. 27, 2017

(65) Prior Publication Data

US 2017/0314340 A1 Nov. 2, 2017

Related U.S. Application Data

(60) Provisional application No. 62/328,519, filed on Apr. 27, 2016.

(51) Int. Cl.
| | | |
|---|---|---|
| *B23K 37/00* | (2006.01) | |
| *E21B 17/10* | (2006.01) | |
| *E21B 19/00* | (2006.01) | |
| *B23K 37/053* | (2006.01) | |
| *B23K 9/04* | (2006.01) | |

(52) U.S. Cl.
CPC ......... *E21B 17/1085* (2013.01); *B23K 9/048* (2013.01); *B23K 37/053* (2013.01); *B23K 37/0538* (2013.01); *E21B 19/00* (2013.01)

(58) Field of Classification Search
CPC ..... E21B 17/1085; E21B 19/00; B23K 9/323; B23K 9/173; B23K 9/0026; B23K 9/0286; B23K 37/04; B23K 37/0417; B23K 37/0426–37/0452; B23K 37/053; B23K 37/0533; B23K 37/0538; B23K 2101/04–2101/10
USPC ........................................ 228/48, 44.5, 49.3
See application file for complete search history.

(56) References Cited

U.S. PATENT DOCUMENTS

| | | | | |
|---|---|---|---|---|
| 2,738,082 A | * | 3/1956 | Vernon | B23K 37/0538 414/433 |
| 2,854,941 A | * | 10/1958 | Vollmer | B23K 37/0536 269/130 |
| 3,658,231 A | * | 4/1972 | Gilman | F16L 1/26 228/44.5 |
| 3,827,126 A | * | 8/1974 | Shiozawa | B25H 1/00 29/721 |
| 3,848,863 A | * | 11/1974 | Owen | B23K 37/0538 228/48 |
| 4,076,130 A | * | 2/1978 | Sumner | B23K 9/0061 29/781 |
| 4,145,593 A | * | 3/1979 | Merrick | B23K 9/0286 219/60 A |
| 4,176,269 A | * | 11/1979 | Merrick | B23K 9/0286 219/60 A |
| 4,378,086 A | * | 3/1983 | Wascat | B23K 31/027 228/4.1 |
| 4,432,486 A | * | 2/1984 | Wascat | B23K 37/053 228/49.2 |

(Continued)

*Primary Examiner* — Kiley S Stoner
(74) *Attorney, Agent, or Firm* — Hankin Patent Law, APC; Kevin Schraven; Anooj Patel

(57) ABSTRACT

A hard banding apparatus for pipes and other drilling tools. The hard banding apparatus has a floating weld box that moves in response to the shape of the item to be welded. The apparatus can include a drive roller assembly and lift mechanisms that lift and move the weld box or housing to a desired height.

19 Claims, 5 Drawing Sheets

(56) References Cited

U.S. PATENT DOCUMENTS

| | | | | |
|---|---|---|---|---|
| 5,685,996 A * | 11/1997 | Ricci | | B23B 5/163 |
| | | | | 219/121.39 |
| 6,098,866 A * | 8/2000 | Tsuchiya | | B23K 20/028 |
| | | | | 228/173.4 |
| 6,335,508 B1 * | 1/2002 | Nam | | B23D 21/00 |
| | | | | 219/121.67 |
| 6,737,601 B1 * | 5/2004 | Kramer | | B23K 9/0216 |
| | | | | 219/125.11 |
| 6,750,420 B1 * | 6/2004 | Gysi | | B21C 37/0818 |
| | | | | 219/121.64 |
| 2006/0163317 A1 * | 7/2006 | Wirth | | B23K 37/0217 |
| | | | | 228/32 |
| 2008/0106018 A1 * | 5/2008 | Bellavance | | B23K 37/0533 |
| | | | | 269/57 |
| 2009/0050613 A1 * | 2/2009 | Prasek | | B23K 9/32 |
| | | | | 219/130.1 |
| 2010/0006627 A1 * | 1/2010 | Bonelli | | B23K 9/0286 |
| | | | | 228/212 |
| 2010/0090453 A1 * | 4/2010 | Bortoli | | B29C 65/7802 |
| | | | | 280/789 |
| 2010/0126968 A1 * | 5/2010 | Page | | B23K 37/0533 |
| | | | | 219/59.1 |
| 2010/0301103 A1 * | 12/2010 | Bonelli | | B23K 9/0216 |
| | | | | 228/227 |
| 2011/0049105 A1 * | 3/2011 | Dupont | | B23K 9/0286 |
| | | | | 219/59.1 |
| 2012/0074205 A1 * | 3/2012 | Dagenais | | B23K 37/0533 |
| | | | | 228/102 |
| 2013/0020295 A1 * | 1/2013 | Schopf | | B23K 37/00 |
| | | | | 219/121.72 |
| 2014/0259597 A1 * | 9/2014 | Lavalley | | B21D 19/10 |
| | | | | 29/407.1 |
| 2014/0346163 A1 * | 11/2014 | Rajagopalan | | B23K 9/0284 |
| | | | | 219/60 A |
| 2015/0174661 A1 * | 6/2015 | Brandstrom | | B23K 37/0276 |
| | | | | 228/9 |
| 2016/0016267 A1 * | 1/2016 | Beatty | | B23K 37/0452 |
| | | | | 29/559 |
| 2017/0182604 A1 * | 6/2017 | Velez | | B23K 37/053 |

* cited by examiner

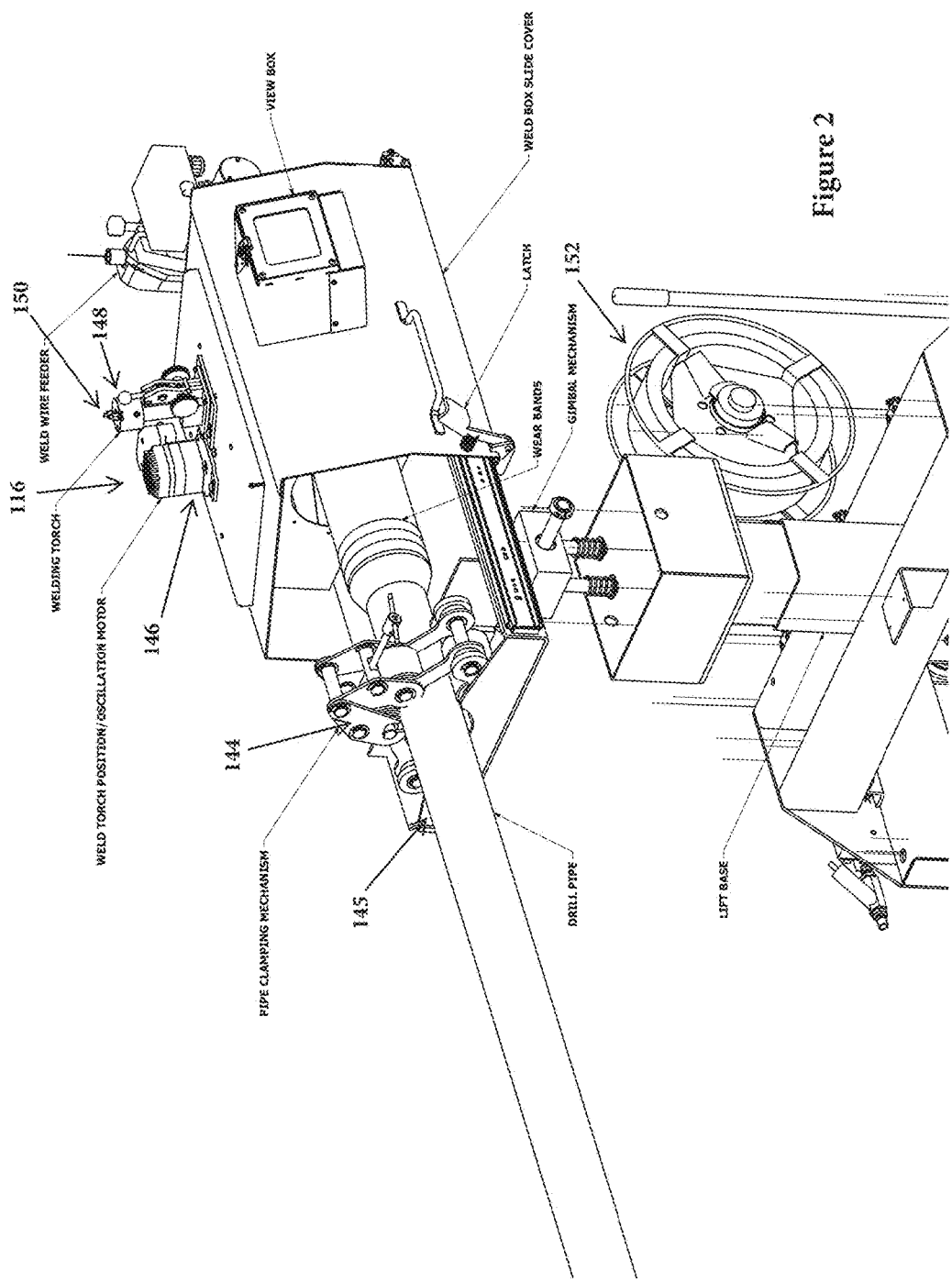

PORTABLE DRILL PIPE HARD BANDING MACHINE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention relates to underground drilling equipment and, in particular, concerns a hard banding apparatus for hard banding drill pipes and other drilling components.

Description of the Related Art

Underground drilling requires the use of a casing and a pipe positioned within the casing. Generally, a casing is formed within a hole and then a drill string, which includes drill pipe, the drill shaft, the drill bit and other down hole components are lowered into the casing to drill at the bottom of the hole.

It is often advantageous to hard band the drill pipe and other down hole components to protect both the casing and the drill string components from abrasive wear. Typically, hard banding comprises welding a hard banding alloy onto the drill pipe and other components. In many implementations, the hard banding is done on the job site with portable hard banding apparatuses. However, these devices are usually trailer mounted devices that are large and require heavy duty trucks to move the apparatus.

More specifically, the typical on-site hard banding apparatus is trailer mounted and has a large heavy head stock rotator that clamps onto the pipe and rotates the pipe as the hard banding material is provided. The head stock rotator is preferably robust enough that the head stock rotator rotates the pipe and even lifts the pipe off of the stands upon which the pipe is sitting when the pipe is bent or curved. Due to the weight of the pipe, the head stock rotator has to be large and robust which necessitates the use of trailers for hard banding apparatuses of this type.

However, the hard banding is often being done at the site of a drill hole which can be located in remote areas and in areas that are difficult to access particularly with a trailer. To this end, there is a need for a hard banding apparatus that is light weight that does not require the use of a trailer. There is also a need for a hard band device that does not require a heavy and robust head stock rotator but can still apply hard band material to pipes that are bent or have curves.

SUMMARY OF THE INVENTION

The aforementioned needs are satisfied, in one exemplary implementation, by a drill pipe welding assembly for use with pipes positioned on a drill pipe rack, the assembly comprising: a housing mounted on a frame, wherein the housing is movable with respect to the frame and wherein the housing has an opening at one end through which the housing receive an end of a pipe to be welded; a welding unit mounted in the housing; a welding unit powered lift mechanism mounted in the housing that moves the drill pipe, wherein drill pipe is secured to the welding unit hydraulic lift mechanism such that bends in the drill pipe result in the housing moving with respect to frame so that the welding unit is maintained in preselected orientation with respect to the portion of the drill pipe being welded.

The aforementioned needs are also satisfied by an apparatus for hardbanding pipes and drilling components comprising: a frame; a welding housing positioned on the frame so as to be vertically adjustable wherein the welding housing receives the pipe or drilling component to be hardbanded from a first direction; a welder positioned within the housing that hardbands the pipe or drilling component; a roller assembly positioned on the frame so as to be vertically adjustable wherein the roller engages with the pipe or drilling component and rotates the pipe or drilling component during hardbanding of the pipe or drilling component; wherein the welding housing is coupled to the frame such that the welding housing moves horizontally and vertically in response to curvature of the pipe or component being hardbanded such that the welding housing maintains the welder in a desired orientation to the pipe or drilling component.

These and other objects and advantages will become more apparent from the following description taken in conjunction with the accompanying drawings.

BRIEF DESCRIPTION OF THE DRAWINGS

FIG. 2 is an exploded perspective view of the hard banding apparatus of FIG. 1;

DETAILED DESCRIPTION OF THE PREFERRED EMBODIMENT

Figure 1A:
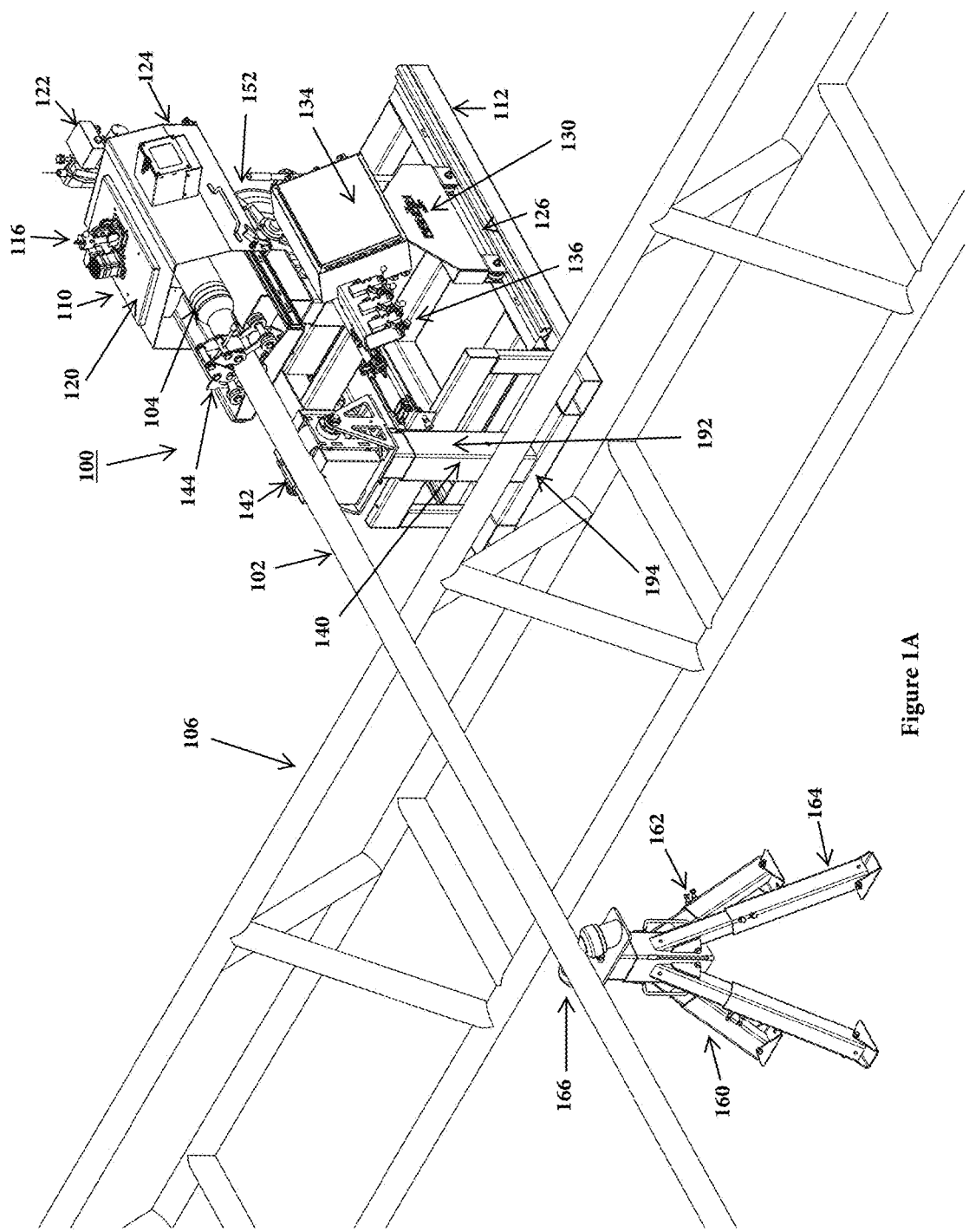
FIGS. 1A and 1B are perspective views of one embodiment of a hard banding apparatus that is shown in FIG. 1B with a rack for the pipe.
Figure 1B:
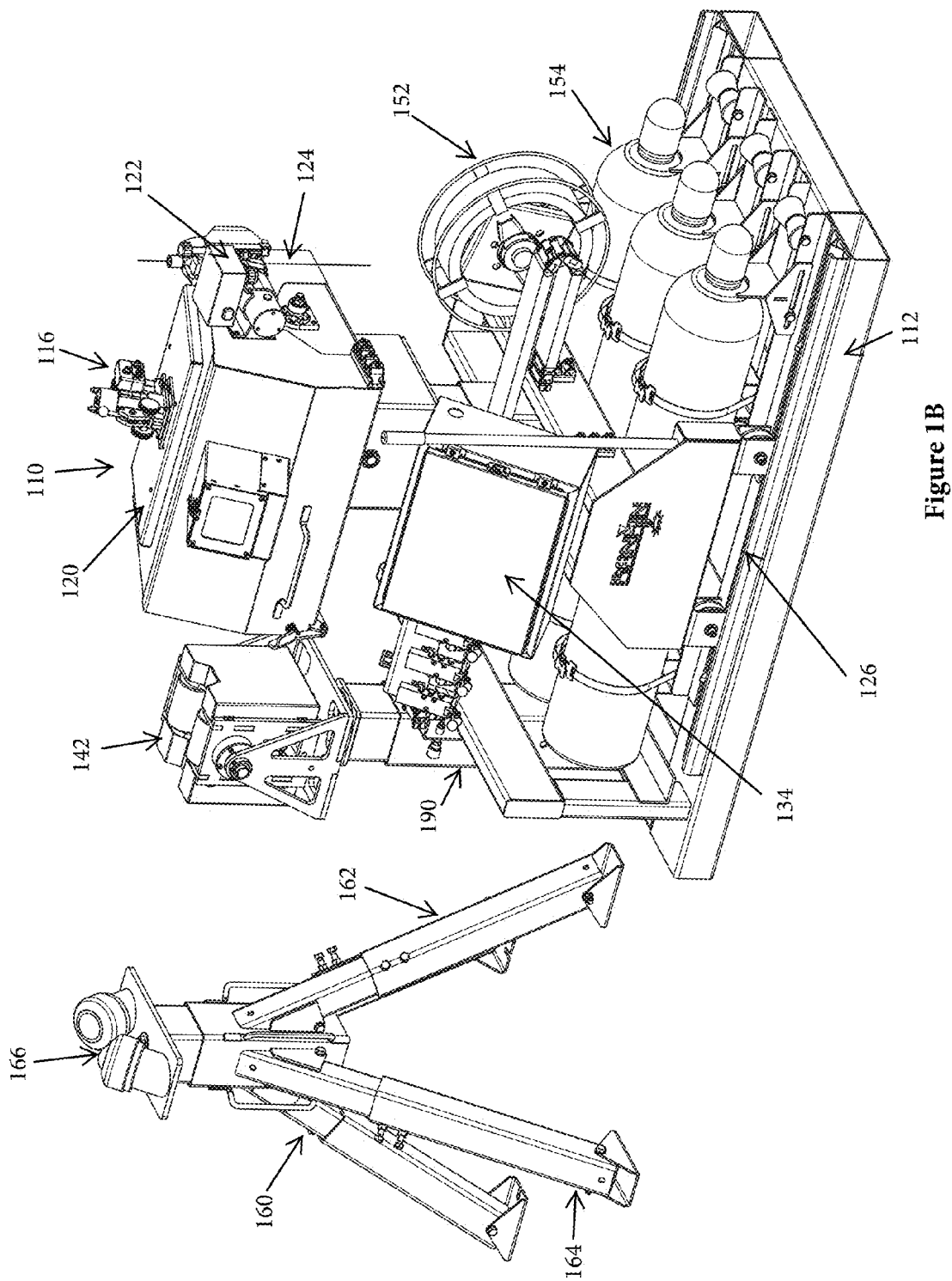

Reference will now be made to the drawings wherein like numerals refer to like parts throughout. Referring initially to FIGS. 1 and 2, the hard banding apparatus 100 will now be described in greater detail. The hard banding apparatus 100 is shown in FIGS. 1A and 1B with a pipe 102 having an end 104 that is to be hard banded. The pipe 102 is supported by one, two or more racks 106 which can be of any configuration known in the art. The hard band apparatus 100 applies hard band material via welding, preferably MIG welding, while rotating the pipe 102. While a pipe is shown in the figures, it will be appreciated that other drilling components may be hard banded by the apparatus 100 without departing from the spirit and scope of the present invention.

The weld housing or box 110 of the apparatus 102 receive the end 104 of the pipe 102 to be hard banded and applies the hard band material within the housing in a known manner. The housing 110 is preferably attached to a frame 112 of the apparatus 100 via a gimbal assembly 114 (See, FIG. 2) such that the weld can be applied perpendicular to the surface of the pipe 102 regardless of whether the pipe or component is bent or shaped.

The weld housing 110 includes a welding assembly 116 positioned on an upper surface 120 of the housing 110. The weld housing also includes a wire feed assembly 122 that is mounted on a back surface 124 of the housing that supplies wire to the weld assembly 116 so that the welding assembly can weld the hard banding material onto the end 104 of the pipe 102.

As shown in FIGS. 1A, 1B and 2, the frame 112 of the apparatus 100 defines two parallel tracks 126 and the apparatus includes carriages 130 that are positioned on the tracks 126 and are connected to the weld housing 110 such that the weld housing 110 can be adjusted along the axis of the pipe (assuming the pipe is straight). A control box 132 and controls 134 are also mounted to the carriages 130 so as to also be movable. The controls 134 and control box allow the operator to control the operation of the apparatus 100 in the manner that will be described in greater detail below.

The frame 112 also includes cross pieces 136 that extend between the tracks 126 and support members 140 are formed to extend vertically and horizontally to provide mounting locations for the vertically adjustable components of the apparatus 100. Preferably, the weld housing 110 can be vertically adjusted to a desired height by powered lift mechanisms as will be described below.

As is also shown in FIGS. 1A, 1B and 2, the apparatus includes a motorized roller assembly 142 that rotates the pipe 102 as the pipe is being hard banded. The roller assembly 142 defines a cradle that receives the pipe or component to be hard banded and is also preferably vertically adjustable and will be described in greater detail in connection with FIGS. 3A and 3B below. The motorized roller assembly 142 is also mounted on the frame 112 to be positioned in front of the weld housing 110.

A clamp assembly 144 is also mounted to a support 145 attached to the housing 110. The clamp assembly 144 defines an opening that receives the pipe 102 and the clamp assembly 144 can then be closed so as it prevent or inhibit movement of the pipe relative to the weld housing to ensure that the hard banding is applied in the correct location. As discussed in greater detail below, the claim 144 connects the weld housing 110 to the pipe such that curves in the pipe or component to be welded cause the weld housing 110 to move horizontally and vertically.

The apparatus also includes one or more auxiliary roller supports 160 that include an adjustable base 162 positioned on a plurality of legs 164 and rollers 166 that can also be adjusted to accommodate different sizes of pipe 102. The auxiliary roller supports 160 provide support of the pipe 102 during hard banding at locations distant from the pipe end 103 to facilitate rolling and movement of the pipe 102 while maintaining the pipe in an orientation suitable for the hard banding process.

FIG. 2 illustrates the components of the weld housing 110 in greater detail. The welding assembly includes a MIG torch that includes a water supply that regulates the temperature of the welding apparatus. There can also be a connection on the weld assembly 116 for a shielding gas to be provided to the weld location to protect the weld from contaminants. The weld torch 148 also receives gasses that are stored in tanks 154 that are also mounted to the frame in the manner shown in FIGS. 1 and 2. The weld assembly also includes a weld torch position oscillation motor 146 that controls the location of the welding torch so as to be able to precisely control the location that is receiving the hard band material.

The weld torch 148 also receives the feed wire via a wire feed conduit 150 from the weld wire feeder assembly 122. The feed wire is stored on a spool 152 that is mounted to the frame 112.

FIG. 2 also illustrates that the weld housing 110 has a slide cover 170 that is removable via a latch 172 to permit access to the end 104 of the pipe 102 that is being welded. A view box 174 may also be provided.

The weld housing or box 112 is preferably positioned on a gimbal assembly 114 that provides motion about multiple axes to permit the welding torch to be positioned perpendicular to the weld surface of the pipe 102 even if the pipe 102 is bent or shaped differently. The gimbal mechanism 180 will be described in greater detail in connection with FIG. 4 below. The gimbal mechanism 114 is positioned on a lift base 182 that is pneumatically actuated so that the vertical position of the weld housing 112 can be adjusted. The lift base 182 comprises a vertical telescoping member 184 that is positioned on a horizontal member 186 that extends between the two track members 126 in the manner shown in FIG. 2. The lift base 182 can be electrically, hydraulically or pneumatically powered.

Similarly, as is shown in FIG. 1, the roller assembly 142 is also mounted on a telescoping lift member 190 that has a vertical telescoping member 192 that is mounted on a horizontal member 194 extending between the track members 126. The controls 134 are preferably enabled to permit an operator to adjust the vertical locations of the roller assembly 142 and the weld housing 112 automatically.

Figure 3A:
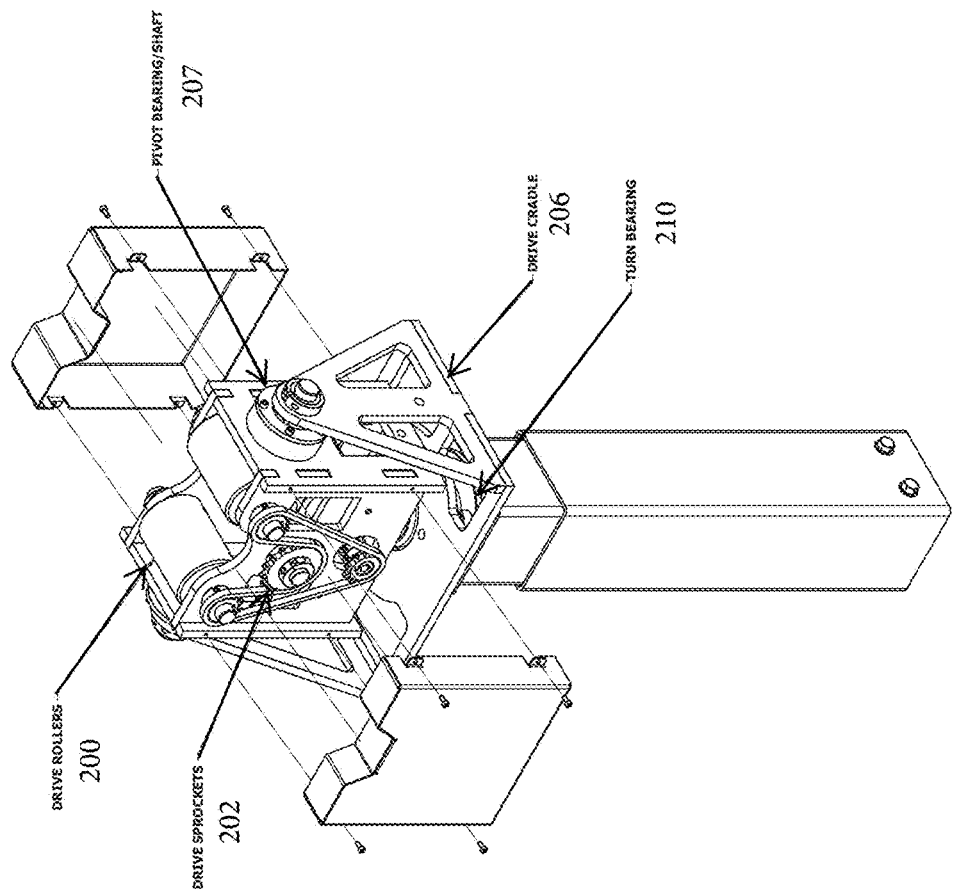
FIGS. 3A and 3B are exploded perspective views of a drive roller assembly of the hard banding apparatus of FIG. 1.
Figure 3B:
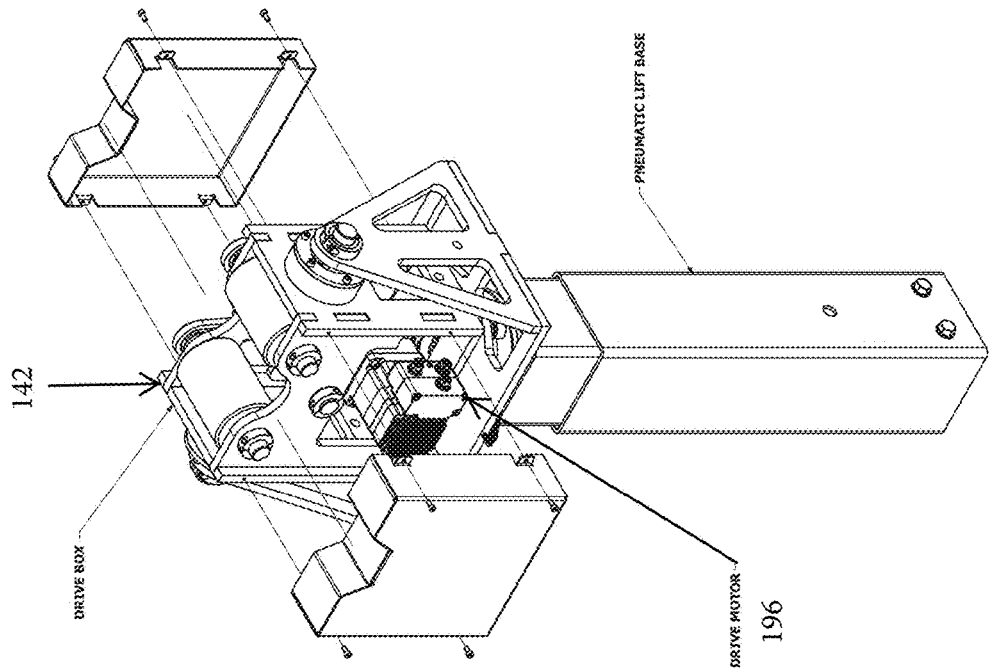

FIGS. 3A and 3B illustrate the roller assembly 142 in greater detail. As shown, the roller assembly is powered by a drive motor 196 that can comprise a stepper motor. In one embodiment, there is a single motor that drives two separate rollers 200 via a sprocket and belt assembly 202. However, it will be appreciated that the roller assembly can be configured in a number of different manners. The rollers are mounted in a housing 204 that is pivotally mounted to a cradle 206 via a pivot bearing 207 that is attached to the pneumatic lift base 190 via a turn bearing 210. As such, the roller assembly 142 can pivot vertically and also rotate horizontally as the pipe is being turned which further facilitates hard banding pipes and other drill train components that have curves and bends. As shown, the drive motor 196, roller assembly and the like can be enclosed by covers.

Figure 4:
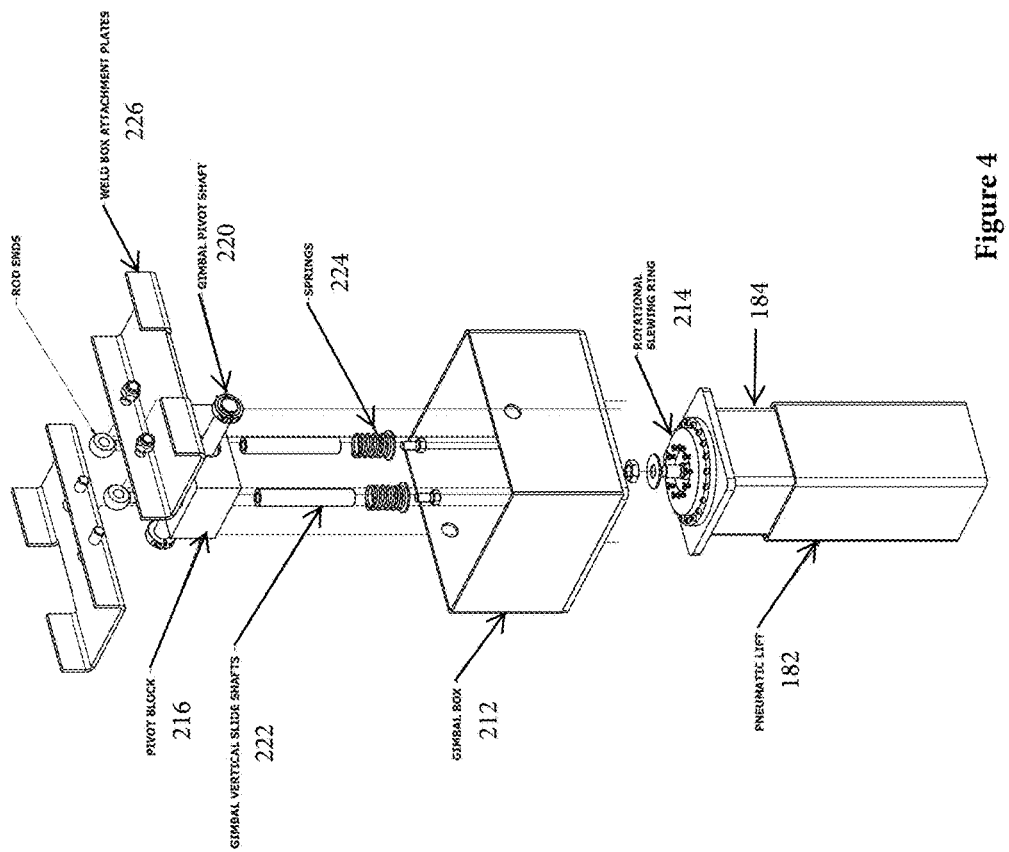
FIG. 4 is an exploded perspective view of a gimbal assembly of the hard banding apparatus of FIG. 1.

FIG. 4 illustrates the gimbal assembly 114 that connects the weld housing or box 110 to the frame 112 in greater detail. As discussed above, the weld housing 110 preferably moves in three directions in response to bends in the pipe or other drill train components that are being hard banded so as to maintain the nozzle of the welding apparatus 116 substantially vertical to the surface that is receiving the hard banding material.

As shown in FIG. 4, the gimbal assembly 114 includes a gimbal box 212 that is attached to the pneumatic lift base 182 via a rotational slewing ring 214. The rotational slewing ring 214 permits movement of the gimbal assembly about a first axis that extends in the direction of the telescoping member 184 of the left base 182. A pivot block 216 is pivotally attached to the gimbal box 214 via a pivot shaft 220 and the weld housing or box 110 is attached to the pivot block via weld box attachment plates 226. The pivot block is also supported by vertical slide shafts 222 and springs 224 that are mounted within the gimbal box 212. The slide shafts 222 engage with the pivot block and allow the weld housing or box 110 to move in an upward direction.

The gimbal assembly 114 thus permits horizontal movement of the weld box or housing 112 as a result of the rotational slew ring 214 and further permits vertical movement of the weld box or housing 112 via the pivot shaft 220, the gimbal box 212 and the slide shafts 222. As such, the weld box or housing 112 can maintain a desired orientation between the nozzle of the welding apparatus 116 and the item that is receiving the hard banding.

As a result of the drive roller 142 and the weld box or housing 112 being movable both horizontally and vertically, pipes and other pieces of equipment that are being hard banded can be precisely hard banded even when these items have curves, bends or other irregular surfaces. This is the result of the welding housing 112 and the drive roller assembly 142 moving with the shape of the pipe or item being hard banded. This is in contrast to prior art hard banding assemblies which has a heavy head stock rotator that can hold the bent or curved piece cantilevered out from the head stock rotator.

Consequently, this embodiment of the hard banding apparatus 100 is significantly lighter and smaller and can thus be transported via the bed of a pickup truck rather than by a separate trailer. In one non-limiting example, the hard banding apparatus 100 is approximately 72 inches by 42 inches and weighs approximately 2,200 pounds.

In operation, the hard banding operation works as follows. The roll drill pipe or item to be hard banded is preferably cleaned and preheated and then rolled into the vicinity of the vertical lifts of the apparatus 100 and is positioned on the drill rack 106. Once the pipe 102 is in position, the auxiliary support 160 and roller assembly 142 are lifted to a desired height. The weld housing 110 is then slid into position along the axis of the pipe 102. At the same time, the weld housing 110 is lifted to the appropriate height such that the roller contacts the surface of the drill pipe. Once the carriage 130 and weld box are in position, the pipe is claimed to the weld box rollers using the claim mechanism 144. Once the pipe 102 is secured, the weld housing 110 is lowered to de-constrain the gimbal mechanism 114 to allow the weld housing to follow any curvatures in the pipe. Once the welding assembly 116 is in the desired position, the hard banding apparatus can be started which results in the material being deposited on the pipe or item to be hard banded and the rotation of the pipe or item to be hard banded is provided by the motor 142 powering the drive rollers 200. The aforementioned apparatus provides a light weight, less expensive hard banding unit that can be provided to more inaccessible locations.

While the foregoing description have shown, illustrated and described at least one exemplary embodiment of the instant invention, it will be apparent to persons of ordinary skill in the art that the form, implementation and uses of the instant invention can vary without departing from the scope and teachings of the instant application. Consequently, the scope of the present invention should not be limited to the foregoing discussion but should be defined by the appended claims.

What is claimed is:

1. A drill pipe welding assembly for use with pipes and drill components, the assembly comprising:
   a housing mounted on a frame, wherein the housing is movable with respect to the frame and wherein the housing has an opening at one end through which the housing receive an end of a pipe to be welded;
   a welding unit mounted in the housing;
   a powered welding unit lift mechanism mounted on the frame that moves the drill pipe, wherein the drill pipe is secured to the welding unit lift mechanism such that bends in the drill pipe result in the housing moving with respect to frame so that the welding unit is maintained in preselected orientation with respect to the portion of the drill pipe being welded; and
   a motor that rotates the pipe.

2. An apparatus for hardbanding pipes and drilling components comprising:
   a frame;
   a welding housing positioned on the frame so as to be vertically adjustable wherein the welding housing receives the pipe or drilling component to be hardbanded from a first direction;
   a welder positioned within the housing that hardbands the pipe or drilling component;
   a roller assembly positioned on the frame so as to be vertically adjustable wherein the roller engages with the pipe or drilling component and rotates the pipe or drilling component during hardbanding of the pipe or drilling component;
   wherein the welding housing is coupled to the frame such that the welding housing moves horizontally and vertically in response to curvature of the pipe or component being hardbanded such that the welding housing maintains the welder in a desired orientation to the pipe or drilling component.

3. The apparatus of claim 2, further comprising a clamp that is coupled to the housing that clamps to the pipe or drilling component so as to secure the housing and the pipe or drilling component together.

4. The apparatus of claim 2, further comprising a gimbal assembly that interconnects the weld housing and the frame.

5. The apparatus of claim 4, wherein the gimbal assembly defines a first axis extending vertically upward from the frame and wherein the gimbal assembly permits horizontal rotational movement of the housing about the first axis.

6. The apparatus of claim 5, wherein the gimbal assembly includes a rotational slewing ring.

7. The apparatus of claim 5, wherein the gimbal assembly defines a second axis, perpendicular to the first axis and substantially perpendicular to the first direction and wherein the gimbal assembly permits vertically pivoting movement about the second axis.

8. The apparatus of claim 7, wherein the gimbal assembly includes a gimbal box with a gimbal pivot shaft mounted to the gimbal box and a pivot block that is coupled to the housing being mounted to the gimbal pivot shaft.

9. The apparatus of claim 8, further comprising gimbal vertical slide shafts that permit movement of the gimbal block in a vertical direction along the first axis.

10. The apparatus of claim 2, wherein the roller assembly has at least one powered roller to rotate the pipe or drilling component.

11. The apparatus of claim 10, wherein the roller assembly defines a cradle to receive the pipe or drilling component and wherein the roller assembly is horizontally rotatable and vertically pivotable such that the cradle moves with the curvature of the pipe or drilling component.

12. The apparatus of claim 11, wherein the roller assembly includes turn bearing and a drive cradle and a pivot shaft is mounted to the drive cradle with a housing that houses the rollers being pivotally mounted in the drive cradle by the pivot shaft.

13. The apparatus of claim 12, wherein the drive cradle is horizontally rotationally mounted to the frame via a turn bearing.

14. The apparatus of claim 2, wherein powered lift mechanisms interconnect the roller assembly and weld housing to the frame that are adjustable.

15. The apparatus of claim 2, further comprising an auxiliary roller support that defines a cradle that receives the pipe, wherein the auxiliary roller support is spaced from the frame and supports a distal end of the pipe or drilling component to be hardbanded.

16. The apparatus of claim 2, further comprising a weld wire feed assembly mounted to the housing that provides weld wire to the welder.

17. The apparatus of claim 16, wherein the weld wire feed assembly includes a spool for housing weld wire that is rotationally mounted to the frame.

18. The apparatus of claim 16, further comprising a gas supply system that provides gas to the weld housing.

19. The apparatus of claim 18, wherein the gas supply system includes tanks mounted on the housing.

* * * * *